United States Patent [19]
Liu et al.

[11] Patent Number: 5,256,192
[45] Date of Patent: Oct. 26, 1993

[54] SOLVENT BASED FLUORESCENT INK COMPOSITIONS FOR INK JET PRINTING

[75] Inventors: Clement Liu, Milford, Conn.; Stephanie S. Hinton, Cookville, Tenn.

[73] Assignee: Dataproducts Corporation, Woodland Hills, Calif.

[21] Appl. No.: 884,709

[22] Filed: May 15, 1992

[51] Int. Cl.⁵ ............................................. C09D 11/02
[52] U.S. Cl. .................. 106/21 A; 106/20 R; 106/20 B; 106/20 D; 346/1.1
[58] Field of Search .............. 106/20 R, 20 B, 20 D, 106/21 A; 346/1.1

[56] References Cited
U.S. PATENT DOCUMENTS

| | | | |
|---|---|---|---|
| 2,970,965 | 2/1961 | Switzer | 106/20 B |
| 3,162,642 | 12/1964 | McCafferty | 106/21 A |
| 3,640,889 | 2/1972 | Stewart | 106/21 A |
| 3,928,226 | 12/1975 | McDonough et al. | 106/21 A |
| 3,960,755 | 6/1976 | Beachem et al. | 106/21 A |
| 3,961,965 | 6/1976 | Zwahlen | 106/22 B |
| 4,015,131 | 3/1977 | McDonough et al. | 106/21 A |
| 4,029,506 | 6/1977 | Dessauer | 106/21 A |
| 4,150,997 | 4/1979 | Hayes | 106/15.05 |
| 4,186,020 | 1/1980 | Wachtel | 106/21 A |
| 4,243,694 | 1/1981 | Mansukhani | 427/14.1 |
| 4,328,332 | 5/1982 | Hayes et al. | 428/296 |
| 4,540,595 | 9/1985 | Acitelli et al. | 427/7 |
| 4,610,806 | 9/1986 | Rosen | 106/21 A |
| 4,620,197 | 10/1986 | Miyamoto et al. | 346/1.1 |

*Primary Examiner*—Helene Klemanski
*Attorney, Agent, or Firm*—Woodcock Washburn Kurtz Mackiewicz & Norris

[57] ABSTRACT

Fluorescent ink compositions and methods for using the ink co positions in drop-on-demand ink jet printers is provided. The fluorescent ink compositions are formulated with an aromatic alcohol, a glycol, a fatty acid, and at least one fluorescent pigment.

23 Claims, 1 Drawing Sheet

SOLVENT BASED FLUORESCENT INK COMPOSITIONS FOR INK JET PRINTING

FIELD OF THE INVENTION

The present invention relates to fluorescent ink compositions for use in drop-on-demand or impulse-type ink jet printers. Specifically, the invention relates to fluorescent ink compositions that produce well-defined images on a variety of substrates.

BACKGROUND OF THE INVENTION

Ink jet printing is performed by discharging ink droplets from a print head to a substrate. The droplets are ejected through orifices or nozzles in the print head and are directed to the substrate to form an image thereon. In contrast to many other types of printing, there is no contact between the printer and the substrate in ink jet techniques.

Most of the ink jet printers known in the art can be characterized as either continuous or impulse devices, depending upon the mechanism by which the ink droplets are directed to the substrate. In continuous ink jet systems, an essentially uninterrupted stream of ink is ejected from a nozzle and breaks up into droplets. The droplets bear an electric charge so that they can be deflected by an applied electric field which is modulated according to the particular image to be recorded. The electric field directs the droplets toward either the substrate or an ink re-circulating reservoir. The inks employed in conjunction with continuous ink jet systems typically comprise a colorant such as a dye or pigment, an electrolyte to facilitate droplet deflection, and a liquid vehicle to dissolve or disperse the colorant and the electrolyte. The vehicle in many continuous-type inks comprises water.

With so-called "impulse" or "drop-on-demand" ink jet printers, image formation is controlled by selectively energizing and de-energizing a piezoelectric transducer rather than by modulating an applied electric field. Ink is stored in the print head or nozzle until it is necessary to form an image on the substrate. The printer is then activated to apply pressure to the ink and discharge a selected number of discrete ink droplets toward the substrate. These ink droplets need not bear an electric charge. Accordingly, impulse ink compositions are free of corrosive substances such as water and electrolytes which continuous stream inks often comprise.

However, impulse ink jet printers present problems that are not encountered in continuous ink jet systems. An important problem is associated with printer standby that may cause the ink to solidify at the discharge orifices of the print head. Therefore, an impulse ink jet composition must be formulated to perform well under such stand-by conditions.

Ordinary ink compositions, which are formulated to be read under natural light, perform well for most uses. However, many inks, including black inks, have reading rates of only about 95% in high speed machine reading applications such as mail sorting and the like. Many known inks also fail to form images having the minimum color intensity required by advanced optical character reading equipment. Fluorescent inks have been suggested to improve the readability of the printed material, as in U.S. Pat. Nos. 4,150,997, 4,540,595, and 4,243,694. These fluorescent compositions, however, are formulated with water or electrolytes for use in continuous printers.

A need therefore exists for ink compositions that can be read by either machine devices or humans, provide higher reading rates, and can be used in an impulse ink jet machine.

SUMMARY OF THE INVENTION

The present invention provides impulse-type ink jet fluorescent ink compositions. The fluorescent ink compositions generally comprise from about 5 to about 75 percent by weight of an aromatic alcohol having the general structure:

where $R_1$ is hydroxyalkyl having from 1-5 carbon atoms and 1-2 oxygen atoms, and $R_2$ is H, OH, or hydroxyalkyl having from 1-5 carbon atoms and 1-2 oxygen atoms, one preferred aromatic alcohol being benzyl alcohol. The compositions also comprise from about 10 to about 90 percent by weight of a glycol component that is either a glycol or a glycol ether, preferably triethylene glycol. The compositions further comprise up to about 15 weight percent of a fatty acid, preferably oleic acid, and at least one fluorescent pigment. In a preferred embodiment, the fluorescent pigment is present in an amount up to about 25 percent by weight, more preferably from about 0.5 to about 5 percent by weight. The fluourescent ink composition can also contain various additives which can function to increase the intensity of the image, to inhibit corrosion of the printer, and to inhibit crystallization of the ink composition.

The present invention also provides methods for recording information on a substrate surface using the novel ink compositions, the recorded information having the ability to fluorsce when exposed to ultraviolet light, and emitting light having a wavelength of from about 500-700 nanometers. Generally, the methods of the invention comprise the steps of providing the ink composition, ejecting one or more droplets of the ink composition from an orifice by the selective application of pressure, and directing the droplets to a receiving surface on a substrate.

BRIEF DESCRIPTION OF THE DRAWING

The numerous objects and advantages of the present invention may be better understood by those skilled in the art by reference to the accompanying figure.

DETAILED DESCRIPTION OF THE INVENTION

Figure 1:
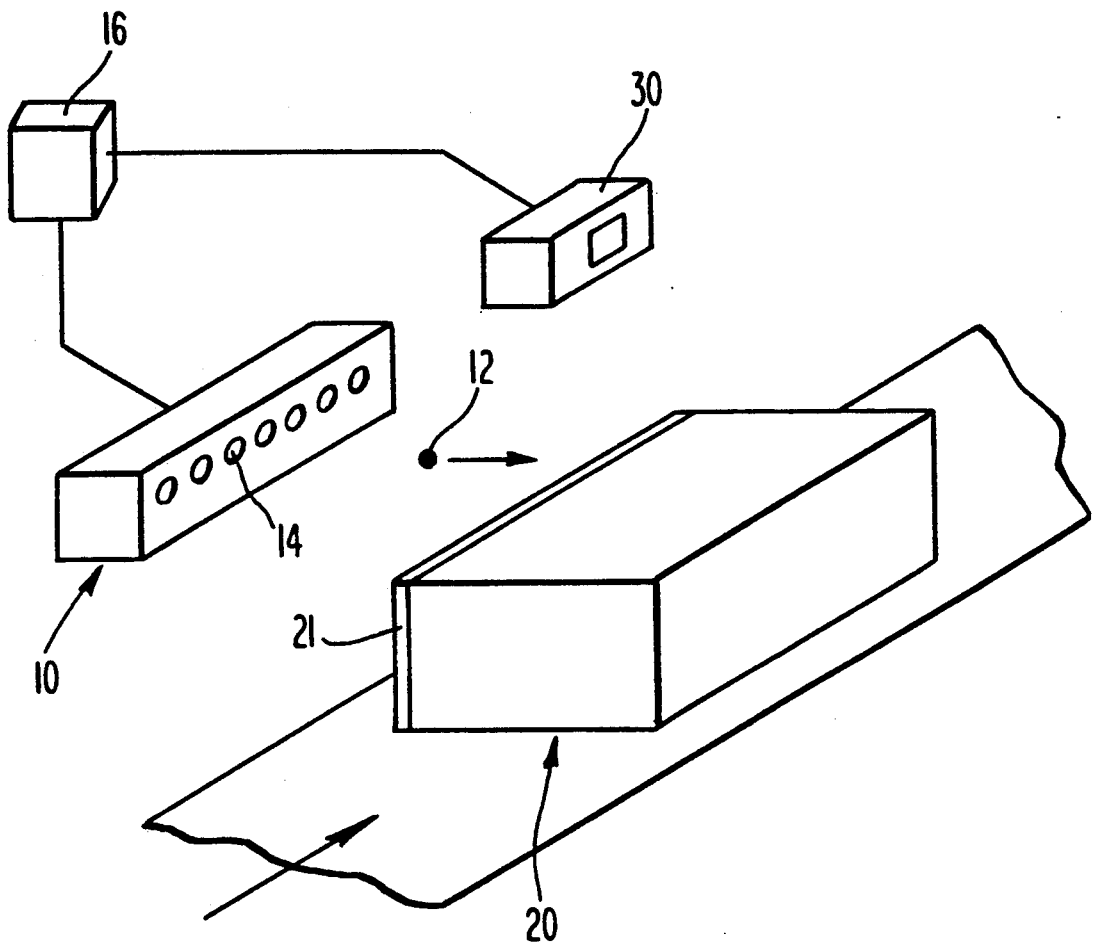
FIG. 1 depicts an impulse ink jet printing apparatus for performing the method of the present invention.

Fluorescent ink compositions of the present invention are designed to be used in impulse ink jet printers. The ink compositions generally contain a fluorescent pigment and a base carrier fluid. The ink composition can contain various other additive components such as brighteners, corrosion inhibitors, crystallization inhibitors, and other compounds known to enhance ink compositions. The primary function of the carrier fluid is to provide a vehicle for transporting the fluorescent pigment to a substrate surface. The carrier fluid is preferably designed to absorb into the substrate, evaporate from the substrate, or a combination of both, thus leaving only the fluorescent ink on the substrate surface. The carrier fluid of the present ink compositions contains an aromatic alcohol, a glycol, and a fatty acid. Preferably, the carrier fluid is essentially free of water and electrolytic compounds and can be considered a non-aqueous system.

The aromatic alcohol employed in the fluorescent ink compositions has the general structure:

(I)

where $R_1$ is an hydroxyalkyl having from 1-5 carbon atoms and 1-2 oxygen atoms, and $R_2$ is H, OH, or an hydroxyalkyl having from 1-5 carbon atoms and 1-2 oxygen atoms. Preferably, the aromatic alcohol has the general structure:

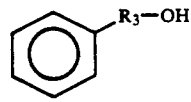

(II)

where $R_3$ is an alkyl having 1-3 carbon atoms. A preferred aromatic alcohol is benzyl alcohol. The aromatic alcohol is present in the ink composition in an amount of from about 5 to about 75 percent by weight, preferably from about 5 to about 50 percent by weight, and more preferably from about 15 to about 25 percent by weight.

The glycol component of the present fluorescent ink compositions can be any of the many glycols, glycol ethers, or mixtures thereof known in the art. The glycol component should be able to solubilize the aromatic alcohol and any fluourescent pigment found in the composition. The glycol component generally has a boiling point of at least about 100° C., preferably at least about 125° C., more preferably at least about 150° C. The glycol component can be described by the general structure:

 (III)

and

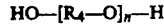 (IV)

where $R_4$ is a straight chain or branched alkyl group having from 1-20 carbon atoms, and n is from 1 to about 10. Representative glycols falling within the scope of these general structures include ethylene glycol, diethylene glycol, triethylene glycol, tetraethylene glycol, propylene glycol, dipropylene glycol, and tripropylene glycol. One preferred glycol is triethylene glycol. The glycol component is present in the ink composition in an amount of from about 10 to about 90 percent, preferably from about 20 to about 70 percent, more preferably from about 40 to about 70 percent by weight.

The fatty acid component of the fluorescent ink compositions is believed to inhibit the crystallization of moieties present in the ink composition such as, for example, benzoic acid. The fatty acid is preferably a branched or straight chain monocarboxylic acid having from 1 to about 40 carbon atoms, preferably from about 12 to about 24 carbon atoms. The fatty acid can be saturated or unsaturated and can be a mixture of such fatty acids. One preferred fatty acid is oleic acid. The fatty acid is present in the ink composition in an amount up to about 15 percent, preferably from about 0.05 to about 10 percent, more preferably from about 0.25 to about 5 percent by weight.

Fluorescent pigments are known per se as those pigments that fluoresce when exposed to ultraviolet light. The pigments fluoresce and emit light having a wavelength of from about 500 to about 700 nanometers, preferably from about 550 to about 650 nanometers, and most preferably from about 575 to about 625 nanometers Fluorescent pigments are well known to those of skill in the art and include, among others, coumarin derivatives, aminocoumarin derivatives, benzoimidazole derivatives, pyrazoline derivatives, carbocyanines, and phenoxazine derivatives. These and other fluorescent pigments are discussed in the literature, specifically in U.S. Pat. Nos. 4,150,997, 4,243,694, 4,620,197, and 4,540,595, all of which are incorporated herein by reference in their entirety. Preferred fluorescent pigments are those available from Day-Glo Color Corp. of Cleveland, Ohio as the DAY-GLO ® fluorescent HM and HMS toners. Fluorescent pigments are present in the ink composition in an amount of up to about 25 percent, preferably from about 0.25 to about 20 percent, most preferably from about 0.5 to about 5 percent by weight. Preferably a mixture of at least two pigments are used to enhance the visibility of the pigment to both machine and human reading.

The fluorescent ink composition also can contain other various additives known in the ink art. A preferred additive is a brightener, which can be added in an amount of up to about 40 percent, preferably up to about 20 percent, and more preferably from about 1 to about 20 percent by weight. In general, the brightener increases the intensity of the printed images. A commercially available brightener is HM-35 manufactured by Day-Glo Color Corp. Another preferred additive is a corrosion inhibitor. The corrosion inhibitor is believed to reduce the corrosion of the metal parts constituting the printer head. Corrosion inhibitors include such compounds as ethoxylated alkylamines, propoxylated amines, and fatty amines. Commercially available corrosion inhibitors include Ethomeen C/25 manufactured by Akzo Chemical Company, and Adogen 172 manufactured by Sherdx Chemical Company. The corrosion inhibitor is present in an amount up to about 5 percent, preferably from about 0.05 to about 2.5 percent, more preferably from about 0.1 to about 1 weight percent.

The fluorescent ink compositions of the present invention are liquids at temperatures from about 20°-70° C. and should have a viscosity in the range of from about 30 to about 60 cps, preferably from about 35 to about 55 cps at about 25° C. The viscosity of the compositions at operating temperatures of about 60° C., is from about 2 to about 20 cps, preferably from about 5 to about 15 cps, and most preferably from about 8 to about 13 cps. The compositions fluoresce when exposed to ultraviolet light and are thus made machine- and human- readable. Typical machine reading devices are mechanical data collection devices such as bar code scanners.

The present invention also provides processes for recording information on a substrate with the above-described ink compositions. The recorded information may be in the form of alphanumeric text, bar codes, or other types of images or symbols, so long as the information is visually or mechanically readable.

A preferred process according to the present invention is depicted in FIG. 1, wherein one or more droplets (12) of the ink composition are ejected from orifices (14) by selectively energizing and de-energizing piezoelectric transducers (not shown) in a print head (10). The operation of the transducers and, hence, the ejection of the droplet is controlled by a processing means (16) such as a computer.

After ejection from the print head (10), the droplet (12) is directed to a receiving surface (21) on the substrate (20) to form a printed image. The printed image should be clear and well-defined, even on porous substrates such as kraft paper and corrugated cardboard.

Numerous printing substrates such as papers, glasses, metals, and plastics are known in the art to comprise receiving surfaces with which ink droplets may be contacted. It will be recognized that substrates can vary greatly in terms of physicochemical properties such as smoothness, porosity and surface treatment, and that such physicochemical properties will greatly influence the printing process and the choice of an ink composition.

It is preferred that the processes of the present invention be performed at print head temperatures between about 25° and about 65° C., more preferably between about 40° and about 60° C. At these temperatures, suitable application viscosities of the ink compositions may be obtained.

As shown in FIG. 1, the substrate (20) preferably has a component of movement transverse to the path of the droplet (12). Such relative movement may be produced by moving the substrate (20) past a stationary print head (10), as shown in FIG. 1, or by moving the print head past a stationary substrate. The accuracy and/or clarity of the recorded information optionally may be determined by reading the information with a mechanical data collection device (30) positioned upstream from the print head (10).

EXAMPLE 1

Fluorescent ink compositions were prepared containing the components set forth in the table below, wherein the quantities are in parts by weight.

| COMPONENT | A | B | C |
| --- | --- | --- | --- |
| Triethylene glycol | 67 | 67 | 67 |
| Benzyl alcohol | 20 | 20 | 20 |
| HMS-34 | 2 | 2 | 2 |
| HMS-30 | 1 | 1 | 1 |
| HM-35 | 10 | 10 | 10 |
| Emersol 221[1] | 0.25 | 0.5 | 1 |
| [1]Emersol 221 has the following chemical analysis: | | | |
| COMPONENT | | WT. % | |
| Oleic acid, $C_{18}H_{34}O_2$ | | 73 | |
| Myristoleic acid, $C_{14}H_{26}O_2$ | | 3 | |
| Palmitoleic acid, $C_{18}H_{30}O_2$ | | 7 | |
| Linoleic acid, $C_{18}H_{32}O_2$ | | 8 | |
| Linolenic acid, $C_{18}H_{30}O_2$ | | 1 | |
| Myristic acid, $C_{14}H_{28}O_2$ | | 3 | |
| Palmitic acid, $C_{16}H_{32}O_2$ | | 4 | |
| Martaric acid, $C_{17}H_{34}O_2$ | | 1 | |

The fluorescent ink composition was prepared by heating the triethylene glycol to about 85°-90° C. The fluorescent pigments, HMS-34 and HMS-30 (available from Day-Glo Color Corp.), strong yellow and strong magenta pigments respectively, along with a brightener, HM-35 (Day-Glo Color Corp.) were then admixed into the triethylene glycol to form a homogeneous composition. The elevated temperature aided the dissolution of the pigments and brightener. The temperature of the solution was then lowered to below about 50° C. and the benzyl alcohol and the Emersol 221 (available from Henkel Chemical Co.) were added accompanied with slight agitation to form a homogeneous mixture. The composition was compounded with steps taken to avoid excess evaporation during the blending process. The fluorescent ink compositions were filtered to remove any undissolved material and impurities.

The final compositions had viscosities, in cps, at 25° C. of 50.8 for A, 49.7 for B, and 49.1 for C, and viscosities at 60° C. of 9.8 for A, 9.4 for B, and 10.3 for C.

EXAMPLE 2

Fluorescent inks compositions containing corrosion inhibitors were formulated following the procedures set forth in Example 1. The compositions of the inks were as follows:

| COMPONENT | D | E | F |
| --- | --- | --- | --- |
| Triethylene glycol | 67 | 67 | 67 |
| Benzyl alcohol | 20 | 20 | 20 |
| HMS-34 | 2 | 2 | 2 |
| HMS-30 | 1 | 1 | 1 |
| HM-35 | 10 | 10 | 10 |
| Ethomeen C/25[1] | 0.25 | 0.5 | — |
| Emersol 221 | 0.25 | 1.0 | 0.5 |
| Adogen 172[2] | — | — | 0.5 |

[1]Ethoxylated cocoalkylamine (Henkel Chemical Co.)
[2]Oleylamine (Sherex Chemical Co.)

The final composition viscosity for E was 51.4 cps at 25° C. and 10.3 cps at 60° C.

What is claimed is:

1. A fluorescent ink composition for use in impulse ink jet printers, comprising:
   (a) from about 5-75% wt. of an aromatic alcohol having the general structure:

where $R_1$ is hydroxyalkyl having from 1-5 carbon atoms and 1-2 oxygen atoms; $R_2$ is H, OH, or hdyroxyalkyl having from 1-5 carbon atoms and 1-2 oxygen atoms;
   (b) from about 10-90% wt. of a glycol component;
   (c) a fatty acid in an amount up to about 15% wt.; and
   (d) a fluorescent pigment in an amount up to about 25% wt.

2. The fluorescent ink composition of claim 1 wherein the aromatic alcohol has the general structure:

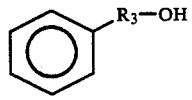

where $R_3$ is an alkyl having 1-3 carbon atoms, and wherein the fatty acid is present in an amount of from about 0.05 to about 10% wt., and the fluorescent pigment is present in an amount of from about 0.25 to about 20% wt.

3. The fluorescent ink composition of claim 2 wherein the ink fluoresces upon exposure to ultraviolet light and emits light having a wavelength of from about 550-650 nanometers.

4. The fluorescent ink composition of claim 2 wherein the aromatic alcohol is present in an amount of from about 15-25% wt.

5. The fluorescent ink composition of claim 4 wherein the aromatic alcohol comprises benzyl alcohol.

6. The fluorescent ink composition of claim 5 wherein the glycol is present in an amount of from about 40-70% wt., and the fluorescent pigment is present in an amount of from 0.5-5% wt., and further comprising a brightener in an amount of from about 1 to about 20% wt.

7. The fluorescent ink composition of claim 6 wherein the fatty acid comprises oleic acid and the glycol comprises triethylene glycol.

8. The fluorescent ink composition of claim 2 wherein the glycol comprises one or more glycols selected from the group consisting of HO—$R_4$—OH and HO—[$R_4$—O]$_n$—H where $R_4$ is a straight chain or branched alkyl group having from about 1-20 carbon atoms, and n is from 1 to about 10, wherein the glycol or glycol mixture has a boiling point above about 100° C.

9. The fluorescent ink composition of claim 8 wherein the glycol comprises triethylene glycol, and the glycol is present in an amount of from about 20-70% wt.

10. The fluorescent ink composition of claim 2 wherein the fatty acid comprises a saturated or unsaturated monocarboxylic acid having from 1 to about 40 carbon atoms and is present in an amount of from about 0.05-10% wt.

11. The fluorescent ink composition of claim 2 further comprising a brightener in an amount from about 1 to about 20% wt. and a corrosion inhibitor in an amount up to about 5% wt.

12. A method for recording fluorescent information on a substrate, comprising the steps of:
(a) providing a fluorescent ink composition which comprises:
(i) from about 5-75% wt. of an aromatic alcohol having the general structure:

where $R_1$ is hydroxy alkyl having from 1-5 carbon atoms and 1-2 oxygen atoms; $R_2$ is H, OH, or hdyroxy alkyl having from 1-5 carbon atoms and 1-2 oxygen atoms;
(ii) from about 10-90% wt. of a glycol component;
(iii) a fatty acid in an amount up to about 15% wt.; and
(iv) a fluorescent pigment in an amount up to about 25% wt.;
(b) ejecting one or more droplets of the fluorescent ink composition from an orifice by the selective application of pressure; and
(c) directing the droplets to a receiving surface on a substrate.

13. The method of claim 12 wherein the aromatic alcohol has the general structure:

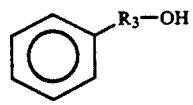

where $R_3$ is an alkyl having 1-3 carbon atoms, and wherein the fatty acid is present in an amount of from about 0.05 to about 10% wt., and the fluorescent pigment is present in an amount of from about 0.25 to about 20% wt.

14. The method of claim 13 wherein the aromatic alcohol comprises benzyl alcohol.

15. The method of claim 13 wherein the glycol comprises one or more glycols selected form the group consisting of HO—$R_4$—OH and HO—[$R_4$—O]$_n$—H where $R_4$ and is a straight chain or branched alkyl group having from about 1-20 carbon atoms, and n is from 1 to about 10, and wherein the glycol or glycol mixture has a boiling point above about 100° C.

16. The method of claim 15 wherein the glycol comprises triethylene glycol in an amount of from about 20-70% wt.

17. The method of claim 13 wherein the fatty acid comprises a saturated or unsaturated monocarboxylic acid having from 1 to about 40 carbon atoms and is present in an amount of from about 0.05-10% wt.

18. The method claim 13 further comprising a brightener in an amount from about 1 to about 20% wt. and a corrosion inhibitor in an amount up to about 5% wt.

19. The method of claim 18 wherein the glycol is present in an amount of from about 40-70% wt., the fatty acid is present from about 0.25-4% wt., and the fluorescent pigment is present in an amount of from 0.5-5% wt.

20. The method of claim 19 wherein the fatty acid comprises oleic acid and the glycol comprises triethylene glycol.

21. The method of claim 13 wherein the receiving surface comprises paper, kraft paper, metal or corrugated cardboard.

22. The method of claim 13 wherein the information comprises alphanumeric text or bar codes.

23. The method of claim 13 wherein the ink fluoresces and emits light at wavelengths of from about 550-650 nanometers.

* * * * *